(12) United States Patent
Chun

(10) Patent No.: US 8,631,934 B2
(45) Date of Patent: Jan. 21, 2014

(54) MULTI-FUNCTIONAL VIDEO DEVICE SUPPORT ACCESSORY

(76) Inventor: James K Chun, Fremont, CA (US)

(*) Notice: Subject to any disclaimer, the term of this patent is extended or adjusted under 35 U.S.C. 154(b) by 0 days.

(21) Appl. No.: 13/372,867

(22) Filed: Feb. 14, 2012

(65) Prior Publication Data
US 2013/0206612 A1  Aug. 15, 2013

(51) Int. Cl.
*B65D 85/00* (2006.01)
*B65D 5/52* (2006.01)
*A47F 5/00* (2006.01)

(52) U.S. Cl.
USPC ........ 206/320; 206/38; 206/45.23; 248/309.1

(58) Field of Classification Search
USPC ............... 206/45.2–45.25, 305, 320, 38; 248/309.1; 455/575.8
See application file for complete search history.

(56) References Cited

U.S. PATENT DOCUMENTS

| | | | |
|---|---|---|---|
| 4,259,568 A * | 3/1981 | Dynesen ............... 206/45.2 |
| 5,887,720 A | 3/1999 | Lin | |
| 6,772,879 B1 * | 8/2004 | Domotor .............. 206/45.23 |
| 7,318,521 B2 * | 1/2008 | Lau .................... 206/45.24 |
| 7,584,841 B2 * | 9/2009 | Chan et al. ............ 206/45.23 |
| D604,501 S | 11/2009 | Lee | |
| 7,669,829 B2 * | 3/2010 | Ogatsu ................ 248/309.1 |
| 7,673,745 B2 * | 3/2010 | Sirichai et al. ......... 206/45.23 |
| 2007/0154048 A1 | 7/2007 | Chang | |
| 2007/0256946 A1 | 11/2007 | Godshaw et al. | |

* cited by examiner

*Primary Examiner* — Bryon Gehman
(74) *Attorney, Agent, or Firm* — Dean A. Craine

(57) ABSTRACT

A multi-functional accessory that acts as a case for transporting an earphone and as a stand for holding a smart cellphone or MP3 player with a display in a landscape or portrait orientation. The accessory includes a housing comprising an upper case and a lower case pivotally connected together along one end with an earphone holding structure mounted on the inside surface on the lower case. The upper case includes two upper side arms and a lower resting lip that extends perpendicularly outward. The lower case includes an integrally formed transverse structure with two axles extending laterally into bores formed in the two side arms of the upper base to enable the upper and lower cases to snap fit together and pivot approximately 270 degrees. An earphone holding structure is attached to the lower case and fits into the space between the upper case and the lower case when closed.

8 Claims, 6 Drawing Sheets

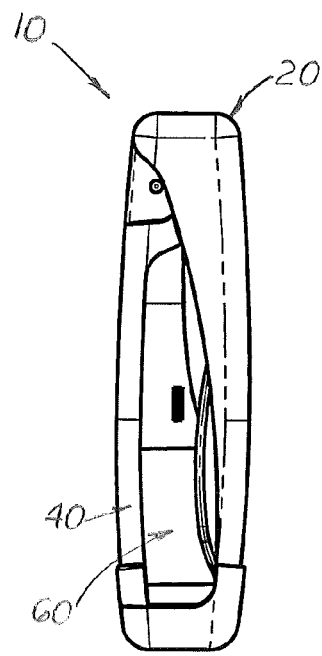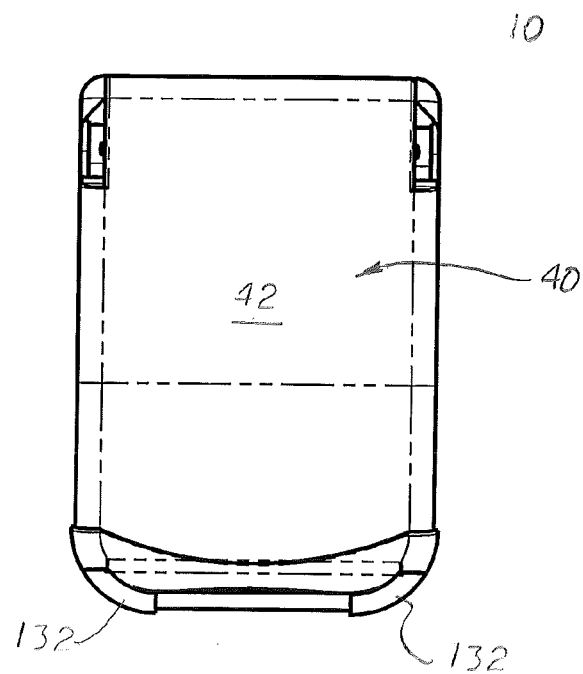
FIG. 5   FIG. 6
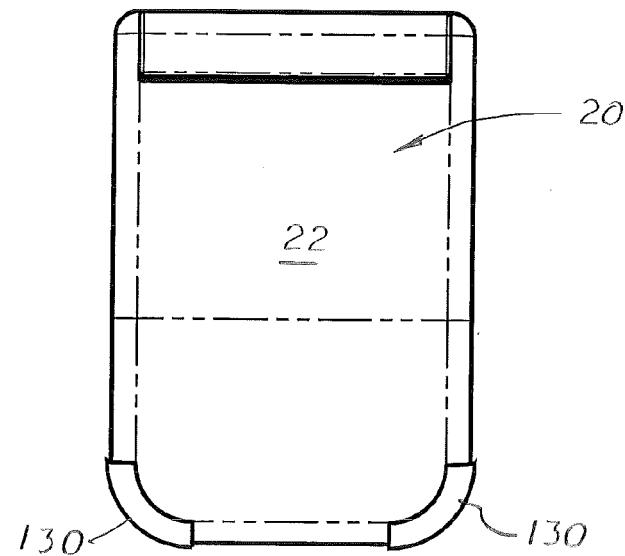
FIG. 7

MULTI-FUNCTIONAL VIDEO DEVICE SUPPORT ACCESSORY

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to portable multi-functional accessories for smartphones or MP3 players with large displays, and particularly to such accessories that store an earphone and can be adjusted to hold the smartphone or MP3 player in a diagonally upright position on a horizontal surface for optimally viewing the display.

2. Description of the Related Art

Many individuals spend considerable amount of time viewing the displays on their smartphones and MP3 players. When moving or standing, the devices are typically held in the individual's hand. When sitting or standing at one location for long periods, many individuals will lean and temporarily rest the device against a wall or a vertical support surface to diagonally align the device's display for optimal and hands free viewing. Unfortunately, a vertical support surface is not always available. Also, the height of a vertical support surface and the frictional forces between the device and the vertical and horizontal surfaces may be insufficient causing the device to repeatedly fall over.

Most smartphones and MP3 players are sold with lightweight earphones that typically have a single, long (approx. 24 inches in length) dual channel main wire connected to two shorter branching ear plug wires. Attached to the end of each ear plug wire is an ear plug designed to fit comfortably in the user's external ear canal. Attached to the opposite end of the main wire is an earphone input plug designed to connect to the device's audio output jack.

One problem with the lightweight earphones sold with smartphones and MP3 players is that the main wire and branching ear plug wires become tangled when placed in a pocket or purse. Also, the protective foam caps commonly used on the ear plugs can be dislodged and lost. As a result, many individuals elect not to carry an earphone when traveling.

Another problem with lightweight earphones is that when connected to the audio output jack on a smartphone or MP3 player, (hereinafter known as a display device) and when the display device is leaned against a vertical support surface for hands free viewing, the movement of the user's head exerts a tugging force on the earphone causing the display device it to be repeatedly fall over.

What is needed is a compact, multi-functional accessory that includes an stand component can be used to hold a smartphone or MP3 player in a hands-free, diagonal upright position on a horizontal surface for viewing videos on the device, and an earphone storage component for a lightweight earphone that enables the earphone to be stored when not in use and easily removed and used with the device when placed on the stand component.

SUMMARY OF THE INVENTION

Disclosed herein is a multi-functional accessory that acts both as a compact earphone carrying case and a display stand. The accessory is designed to be configured into a small, compact configuration for transporting an earphone in the user's pocket or pulse. Earphone is stored inside the inner cavity formed with the accessory is closed. When the accessory is opened, it may be a display stand. When desired, the accessory may be selectively manipulated into an extended, open configuration for holding a display device in diagonal, hands-free position on a horizontal surface. One advantage to the invention is that the earphone may remain in a stored configuration when the accessory is a display stand.

More specifically, the accessory includes a clam shell-style housing comprising an upper case and a lower case pivotally connected together along two adjacent ends. Mounted on the inside surface of the lower case is replaceable earphone holding structure that enables the user to tightly wrap and store a standard earphone inside the inner cavity formed when the upper and lower cases are closed. The upper case includes a main panel with two parallel side walls. Formed on the lower end of the main panel is a transversely aligned lower lip and extends substantially perpendicularly and outward from the main panel's inside surface. The opposite ends of the lower lip are open thereby forming a continuous slot capable of receiving the lower or side edges of a display device. Formed on the opposite side of the main panel is a top opening surrounded by the two side walls extend upward and surround the top opening thereby forming two parallel side arms with two axle bores formed on their inside surfaces.

The lower case includes a hollow, upper transverse structure with two laterally extending axles that snap fit into the two axle bores formed on the two side arms. After assembly, the two axle bores and the two axles pivotally connect the upper case and lower case together. The widths of the top opening formed on the upper case and the width and height of the transverse structure on the lower case allow the upper case and lower case to pivot between a closed position and an opened open position. The top opening and the transverse structure are also configured to allow the upper case and the lower case to pivot approximately 270 degrees enabling the display device to be configured into an inverted V-shaped configuration on a horizontal surface. Optional pegs and peg holes are formed on the adjoining surface of the side arms and the ends of the transverse structure that enable the cases to be temporarily locked together in the closed or opened positions.

When the accessory is used as a hands-free display stand, the upper and lower cases may pivot apart to an opened position to form an inverted V-shaped structure with the upper and lower cases being diagonally aligned. A display device may be rotated in either a landscape or portrait orientation and placed against the upper case's main panel and in the slot formed on the lower lip.

The means for storing the earphones is an exchangeable earphone holding structure designed to fit into the inner cavity formed between the upper case and the lower case when closed. The earphone holding structure includes an upper flange surface that is spaced apart and substantially parallel to the lower case's main panel. Attached or integrally formed on the upper flange surface and perpendicularly aligned with the inside surface of the lower case is a cord wrapping frame. During use the main and branching cords on an earphone is then wrapped around the cord wrapping frame. Formed on the upper flange surface are two recessed ear bud resting cavities and ear plug cavity that reduces the overall height profile of the earphone when wrapped on the earphone holding structure.

DESCRIPTION OF THE DRAWINGS

FIG. 5 is a side elevational view of the accessory shown in FIG. 2 in a closed configuration.

FIG. 6 is a rear elevational view of the accessory shown in FIGS. 2 and 5.

FIG. 7 is a front elevational view of the accessory shown in FIGS. 2, 5 and 6.

DESCRIPTION OF THE PREFERRED EMBODIMENT(S)

Figure 1:
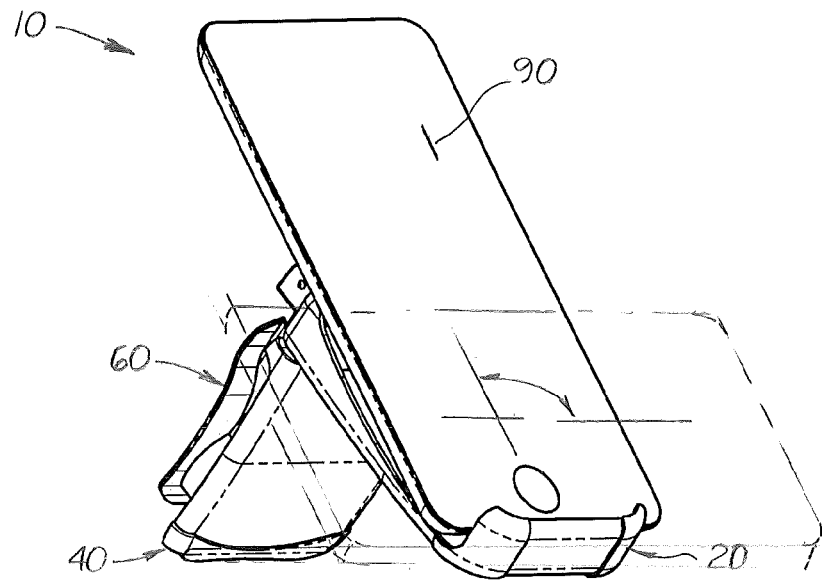
FIG. 1 is a front perspective view of the multi-functional video device accessory shown in an opened configuration and holding a display device in the diagonally aligned upper base and the lower base holding an earphone.
Figure 2:
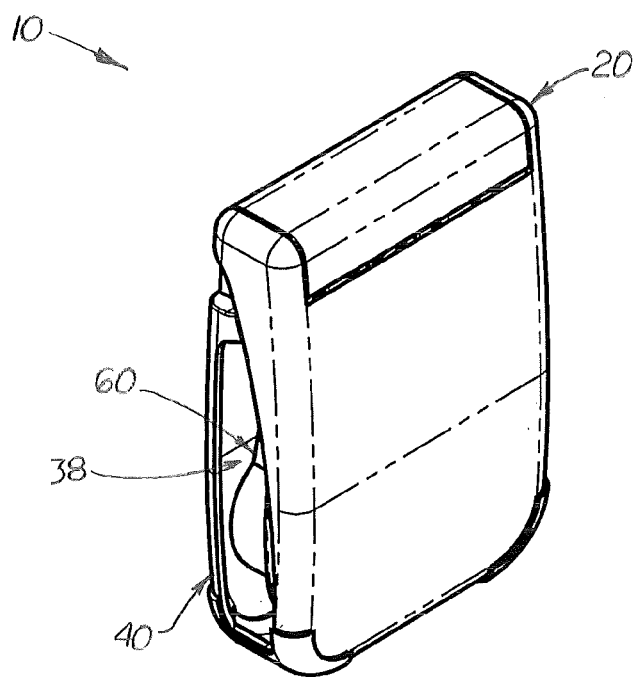
FIG. 2 is a front perspective view of the multi-functional device accessory shown in a closed configuration and holding an earphone.
Figure 3:
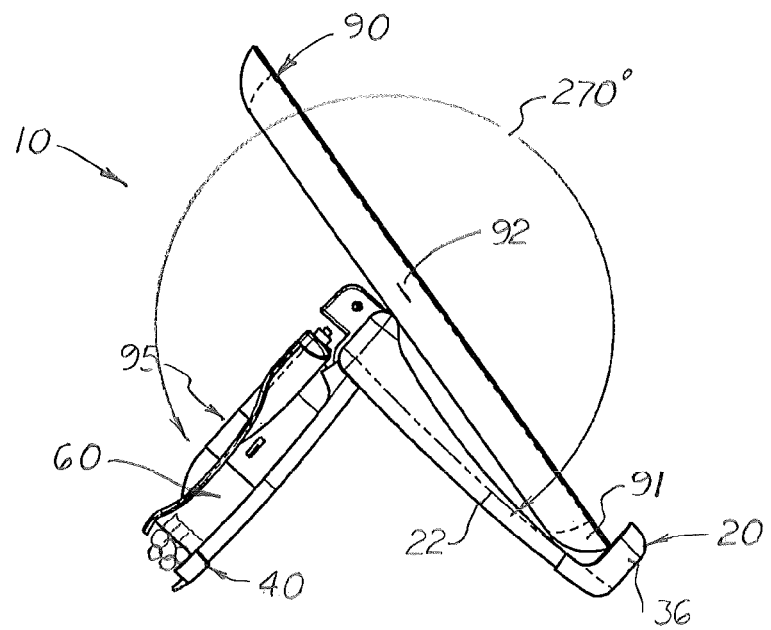
FIG. 3 is a side elevational view of the display device shown in FIG. 1.
Figure 4:
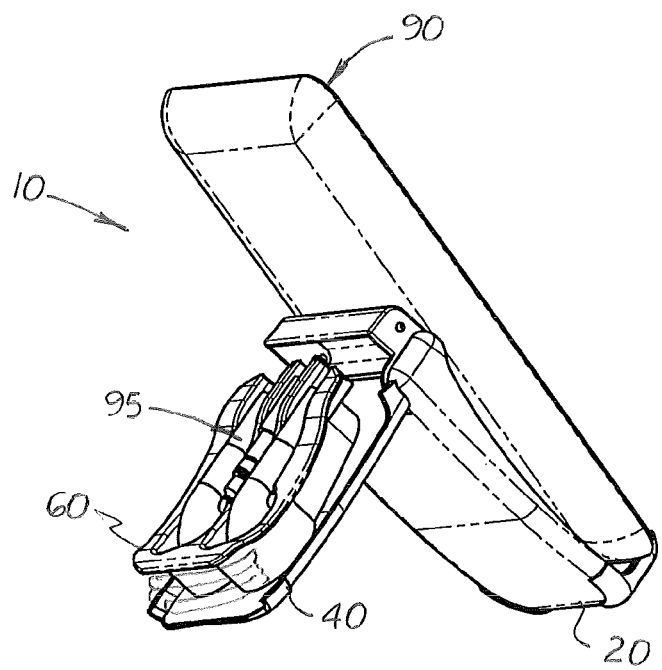
FIG. 4 is a rear perspective view of the multi-functional display device accessory shown in FIGS. 1 and 3.
Figure 8:
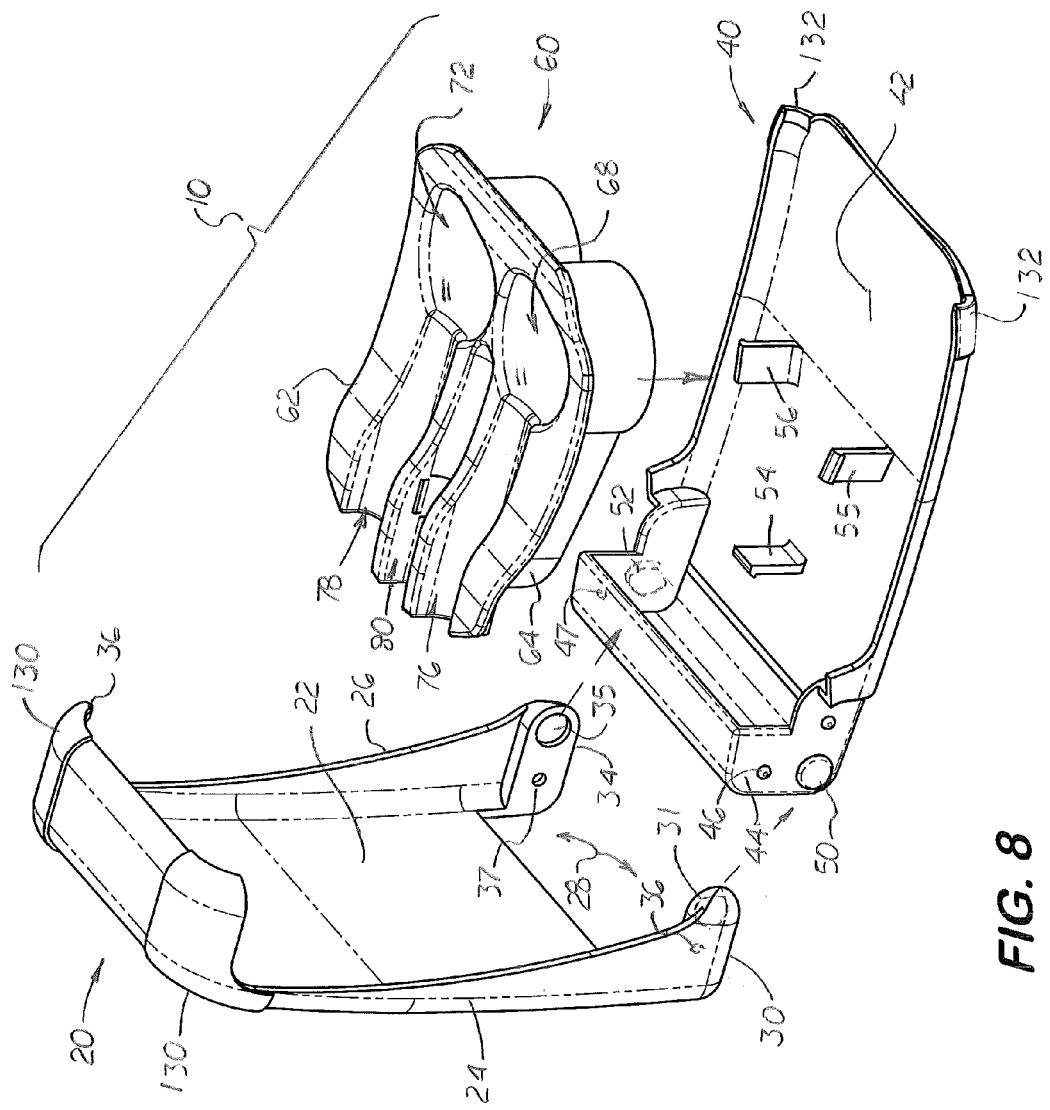
FIG. 8 is an exploded perspective view of the accessory.
Figure 9:
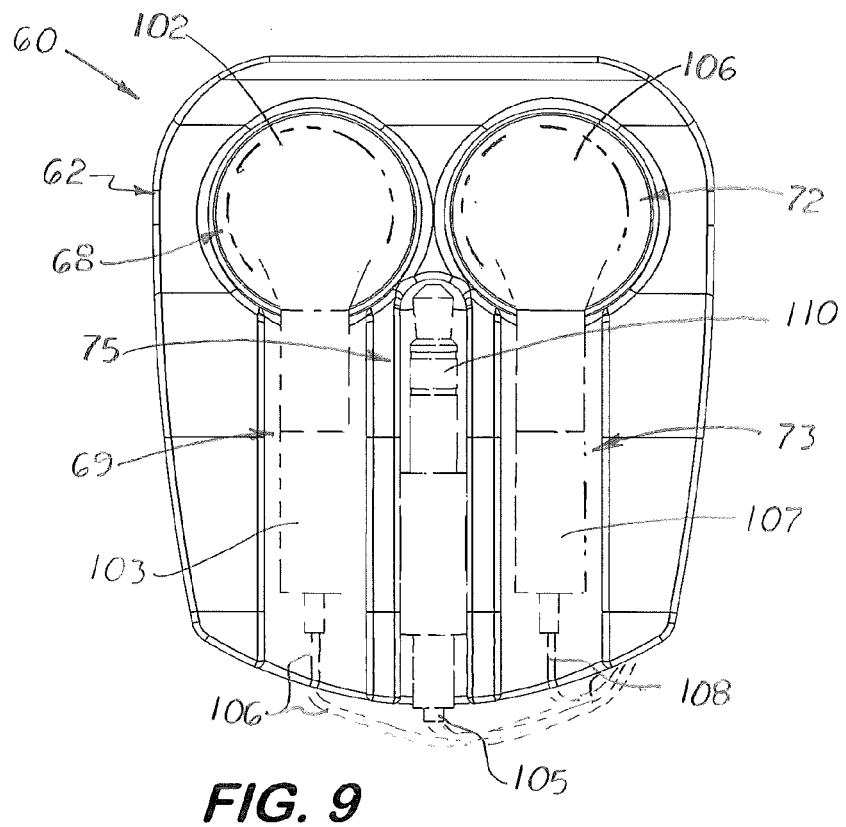
FIG. 9 is a top plan view of the earphone holding structure.
Figure 10:
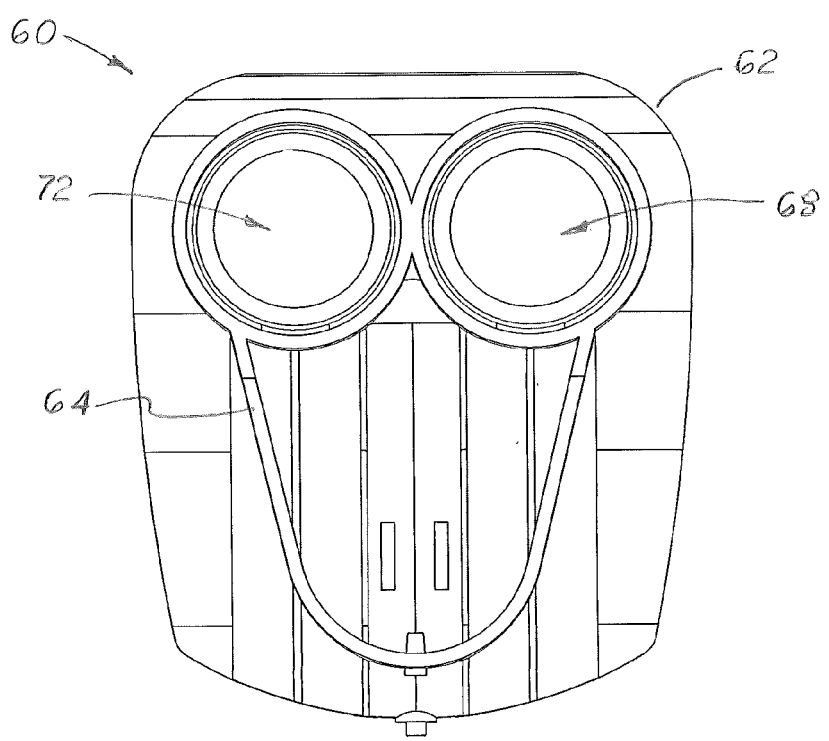
FIG. 10 is a bottom plan view of the earphone holding structure.
Figure 11:
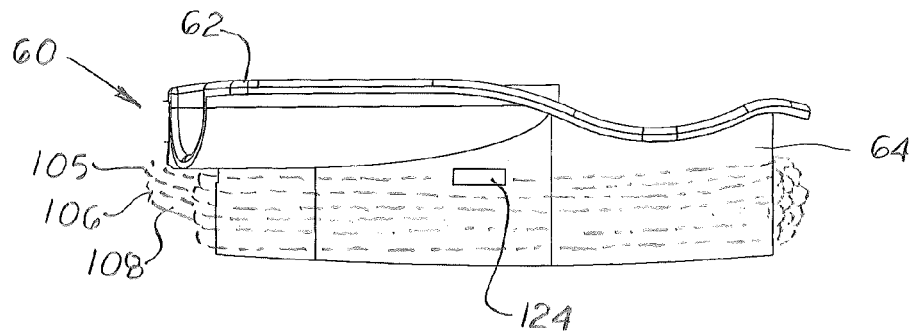
FIG. 11 is a right side elevational view of the earphone holding structure.
Figure 12:
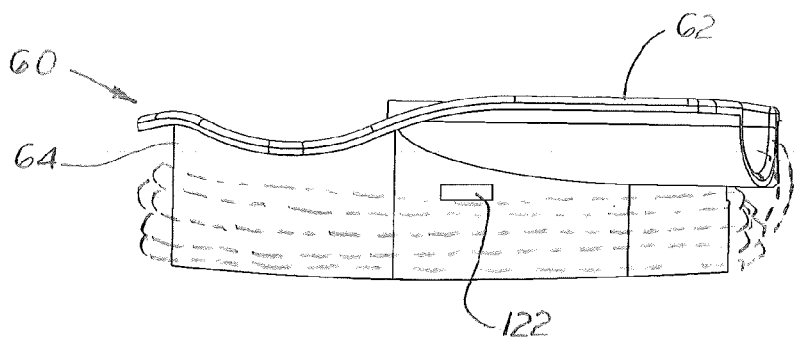
FIG. 12 is a left side elevational view of the earphone holding structure
Figure 13:
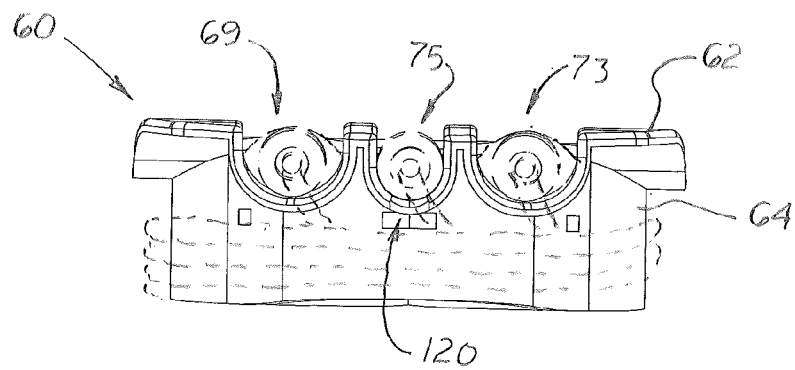
FIG. 13 is a rear side elevational view of the earphone holding structure.

Referring to the accompanying FIGS. 1-13, there is shown a multi-functional accessory 10 that acts as a small, portable, video device stand and an earphone case when disposed in an open configuration as shown in FIGS. 1, 3 and 4 and acts as a compact earphone carrying case as shown in FIGS. 2, 5 and 6.

When the accessory 10 is manipulated into an open configuration, the upper case 20 is diagonally aligned to support a device 90 for optimal viewing. When the accessory 10 is manipulated into a closed configuration, the earphones 100 located inside the accessory 10 is protected and the overall size of the accessory 10 is reduced for easy portability in the user's pocket or pulse.

More specifically, the accessory 10 includes a clam shell-style housing 12 comprising an upper case 20 and a lower case 40 pivotally connected together along one end with a replaceable earphone holding structure 60 mounted on the inside surface on the lower case 40. As shown more clearly in FIG. 8, the upper case 20 is a planar structure that includes a main panel 22, two inward extending side walls 24, 26. The main panel 22 is shorter than the two side walls 24, 26, and thereby forming a wide top opening 28 surrounded by two parallel side arms 30, 34. Formed on the opposite end of the main panel 22 is a transversely aligned resting lip 36 that extends substantially perpendicular to the main panel 22. When the housing 12 is disposed in a closed position, the resting lip 36 forms an end surface. When the housing 12 is disposed in an open position, the resting lip 36 forms a continuous slot capable of receiving the lower or side edge of a device 90. Formed on each side arm 30, 34 is an axle bore 31, 35, respectively.

The bottom case 40 is also a planar structure and includes main panel 42 with a hollow, upper transverse structure 44. Formed ends of the transverse structure 44 are two laterally extending axles 50 52 that snap fit into the two axle bores 31, 35 formed the upper case's side arms 30, 34, respectively. The upper case 30 includes a top opening 28 in which the transverse structure 44 is inserted to pivotally connect the upper case and lower case together. The size of the transverse structure 44 is sufficient so it does not touch or interfere with a display device 90 placed against the upper case 20. In the preferred embodiment, the width and height of the transverse structure 44 is sufficient so the upper and lower cases 20, 40 when connected together may to pivot approximately 270 degrees between a closed, planar configuration to open configuration as shown in FIG. 3. When pivoted to an open position, the upper case 20 and lower case 40 are diagonally aligned and converge along a top edge to support a video device 90 oriented in portrait orientation or in a landscape orientation as shown in FIG. 1.

The earphone holding structure 60 is designed to fit into the space 38 formed between the upper case 20 and the lower case 40 when disposed in a closed. As shown more clearly in FIGS. 8-13, the earphone holding structure 60 includes an upper flange surface 62 that is substantially parallel to the main panels 22 and 42 on the upper and lower cases 20, 40, respectively. Attached or integrally formed on the upper flange surface 62 and perpendicularly aligned with the inside surface of the lower case 40 is a cord wrapping frame 64. Formed on the upper flange surface 62 are two ear bud resting cavities 68, 72 each configured to receive and hold an earplug 102, 106, respectively. Each ear bud cavity 68, 72 communicates with an elongated, recessed ear plug stem cavity 69, 73, each designed to receive the elongated ear plug stem 103, 107, respectively. The end of each cavity 69, 73 terminates and the outside edge of the upper flange surface 62.

Disposed between the two stem cavities 69, 73 is a main cord plug cavity 75 designed to receive the elongate main plug 110 attached to the end of the main earphone wire 105. During use, one or two ear plugs 102, 106 are inserted into the ear bud cavities 68, 72, respectively. The ear plug stems 103, 107 are then pressed into the ear plug stem cavities 69, 73, respectively. The ear plug branch wires 106 and 108 are then wrapped in one direction around the cord wrapping frame 64. The main earphone cord 105 is also wrapped around the cord wrapping frame 64 and the main plug 110 is then inserted into the main cord plug cavity 75.

In one embodiment, the earphone holding structure 60 is designed to be replaceable to accommodate different earphones with different styles and sizes of ear plugs. Connection tabs 54, 55, 56 are formed on the inside surface of the lower case's main panel 42 that engage complimentary shaped slots 120, 122, 124, respectively, formed on the earphone holding structure 60 to hold the earphone holding structure 60 on the inside surface of the main panel 42. The earphone holding structure 60 may be removed and replaced by an alternative earphone holding structure designed to be used with another type of earphone.

In one embodiment, the housing 12 is made of plastic and measures approximately ⅝ inches in height, 2½ inches in length, and 1¾ inches in width. In one embodiment, optional gripping pads 120 and 125 are attached the lower ends or the upper case and an lower case to increase the frictional forces to hold the housing in an open configuration on horizontal surface. Also, optional holes 36, 37 and pegs 46, 47 may be formed on the adjacent surfaces of the side arms 30, 34 and the ends of the transverse structure 44 to temporarily resist accidental movement from the closed or opened positions.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An adjustable pocket or purse portable accessory that can be manipulated into a closed, flat planar configuration for selectively storing an earphone and that can be manipulated into an open, inverted V-shaped configuration and used to support a display device with a display in a substantially diagonal position, said accessory comprising:
   a. a compact, clam shell-shaped housing with a center storage area, said housing includes an upper case and a lower case pivotally connected together, said upper case and said lower being configured so said upper case and said lower case may be pivoted together to form a closed housing surrounding an inner cavity or pivoted apart to an inverted V-shaped configuration with an inside surfaces of said upper case and an inside surface of said lower case being exposed, said upper case includes a means for supporting a display device longitudinally or transversely aligned over said upper case when disposed in an inverted V-shaped configuration, and,
   b. an earphone holding structure mounted on or integrally formed on said inside surface on said lower case.

2. The accessory as recited in claim 1, wherein said earphone holding structure includes an upper flange and a cord wrapping structure, said upper flange includes two recessed ear bud resting cavities and ear plug cavity that reduces the overall height profile of the earphone when wrapped on the earphone holding structure.

3. The accessory as recited in claim 1, wherein said means for supporting a device longitudinally or transversely aligned over said upper case is a lower resting lip formed on said upper case.

4. The accessory as recited in claim 1, further including a friction gripping cover attached to said lower resting lip to prevent slippage of said resting lip when said housing is disposed in an inverted V-shaped configuration.

5. The accessory as recited in claim 1 wherein said upper case includes two side arms separated by an opening and said lower case includes a transverse structure that fits into said opening, said side arms and said transverse structure include means for pivotally connecting said upper case and said lower case together.

6. The accessory, as recited in claim 1 wherein the device is a cellphone or an MP3 player with a video display.

7. A multi-functional accessory for a device with a display, comprising:
   a. a clam shell-shaped housing that includes an upper case and a lower case pivotally connected together along one end, said upper case includes a panel with two upper side arms extending longitudinally therefrom and a lower resting lip that extends perpendicularly outward from said panel, formed on each said side arm is a respective axle bore, said bottom case includes a second panel with an upper transverse structure formed thereon with two laterally extending axles, each said axle snap fits into one of said axle bores to pivotally connect said upper case and said lower case together; and,
   b. an insert mounted on the inside surface of said lower case, said insert includes an upper flange surface is substantially parallel to the front and rear surfaces of the upper and lower cases, attached or integrally formed on said upper flange surface and perpendicularly aligned with the inside surface of said lower case is a cord wrapping frame, said upper flange surface includes two ear bud resting cavities, each ear bud cavity communicates with a recessed ear plug stem cavity that is substantially parallel with the other recessed ear plug stem cavity, both said recessed ear plug stem cavities extend from said ear bud resting cavities and terminate at the edge of said upper flange thereby enabling the earplug cords and a main cord on an earphone to be compactly wound around said cord wrapping frame.

8. A compact pocket or purse portable accessory for selectively storing an earphone and that can be manually configured to support a cellphone in a substantially diagonal position on a horizontal surface for viewing a display of the cellphone in either a landscape or portrait orientation, said accessory comprising:
   a. a compact, clam shell-shaped housing with a center storage area, said housing includes an upper case and a lower case pivotally connected together, said upper case and said lower being configured so that said upper case and said lower case may be pivoted apart and into an inverted V-shaped configuration on a horizontal support surface said upper case being configured to support a longitudinally or transversely aligned cellphone placed thereon; and,
   b. a means for holding an earphone on said lower case.

* * * * *